N. E. HIRSCH.
RELEASING MECHANISM FOR AIR BRAKE SYSTEMS.
APPLICATION FILED MAY 4, 1914.
1,139,866. Patented May 18, 1915.
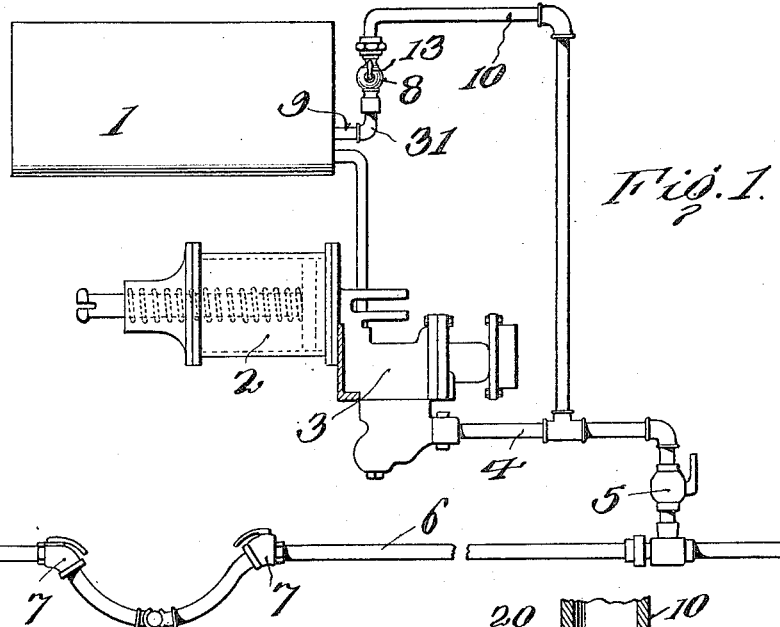
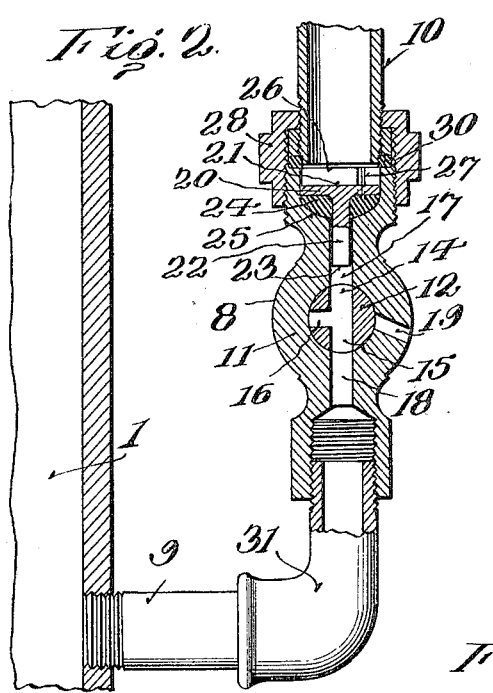
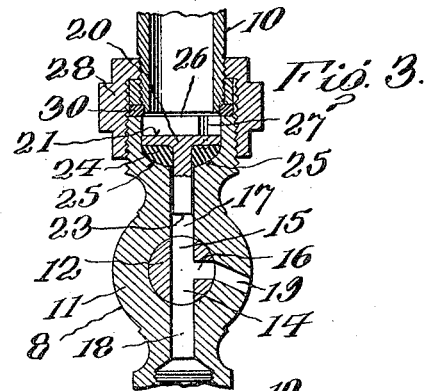
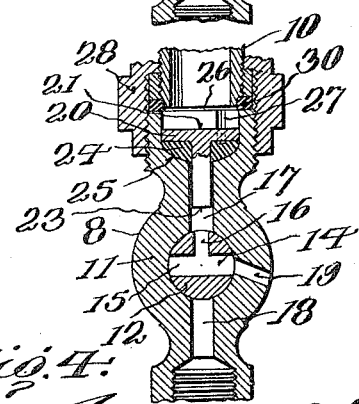
Witnesses
James Fitz Gibbon
Nathan Abramson
Inventor
Nicholas E. Hirsch
By Helge O. H. Murray
his Attorney

UNITED STATES PATENT OFFICE.

NICHOLAS E. HIRSCH, OF SAN LUIS OBISPO, CALIFORNIA.

RELEASING MECHANISM FOR AIR-BRAKE SYSTEMS.

1,139,866.  Specification of Letters Patent.  Patented May 18, 1915.

Application filed May 4, 1914. Serial No. 836,297.

*To all whom it may concern:*

Be it known that I, NICHOLAS E. HIRSCH, a citizen of the United States, residing at San Luis Obispo, in the county of San Luis Obispo and State of California, have invented certain new and useful Improvements in Releasing Mechanism for Air-Brake Systems, of which the following is a specification.

This invention relates to certain new and useful improvements in automatic release valve mechanisms used in connection with the air brake system for railways.

In practice at the present time, the release valves are operated by holding the valve open for upward of several minutes while the air in the reservoir is exhausting. This operation requires much time as the reservoir on each car in the train must be emptied of its contents, and long delays are sometimes experienced in making up trains.

It also frequently happens that when a train has been in transit for many hours the air brakes upon one or more of the cars become defective and when an application is made they go on too hard, or else remain applied, and cause great damage to the wheels.

It is to overcome these and other difficulties now experienced that the present automatic release valve has been designed.

An object of the present invention is to provide a release valve which when normally set after making up the train, will automatically allow the reservoir and train line to exhaust their contents, should the engine be detached from the train, and the angle cock opened, as is the usual custom. As the air passes out through the angle cock the brakes are released, and the train is ready to be shifted about as desired.

Another object of the present invention is to provide a release valve which can be so operated, that should the air brakes upon one or more of the cars of a train while in transit become defective and refuse to respond, they can be readily cut out from the rest of the system, thereby preventing damage to the wheels. Means is also provided in the release valve for preventing the air from the train line backing up in the reservoir and causing the defective brakes to operate. The cut out cocks in the present systems usually leak and, notwithstanding the fact that the reservoir has been cut out from the train line, air will leak through the cut out cock and back up into the reservoir. A reduction now in the train line will, if the air in the reservoir has sufficiently increased in pressure, cause the defective brakes to grip the wheels and operate to the damage of the car. My present release valve prevents this air from backing up in the reservoir when the release valve is operated because of its connection direct to the atmosphere.

Another object of my invention is the provision of a release valve which can be so operated that the air in the reservoir can be retained therein in case of emergency. This is effected by the manual operation of the valve when the accident has been discovered.

With these and other objects in view, my invention further consists in the combination and arrangement of parts hereinafter described and claimed.

In the drawings,—Figure 1 is a diagrammatic illustration of an air brake system with my invention applied thereto. Fig. 2 is a vertical sectional view upon an enlarged scale through my improved automatic release valve, which has been set when the train is made up for normal running condition. Fig. 3 is a similar view with the three-way valve set, when the brakes are defective or refuse to respond; and Fig. 4 is a similar view illustrating the position of the valve when set to retain the air in the reservoir of the cars.

Referring to the drawings: This invention embodies the especial design of the release valve mechanism located between the reservoir and the branch connection leading from the train line.

The system as represented in Fig. 1 includes the reservoir 1, the brake cylinder 2, the triple valve 3, the branch pipe 4, the cut-out cock 5, the train line 6, and the angle cock 7, as shown, near the usual coupling. The construction and operation of these several mechanisms are well known in the art and a detailed description thereof will not be included. The release valve 8 is connected to the reservoir by the pipe connection 9 and is also connected to the branch 4 by the pipe connection 10.

Referring more particularly to Figs. 2, 3 and 4 of the drawings, the release valve comprises a casing 11 in which is positioned a three-way valve 12. This valve, as shown, is of the rotary type and has the usual operating handle 13 extending without the casing. Ports 14, 15 and 16 are provided in this said valve and are adapted to make certain registrations with the main passageways 17 and 18 and the vent 19 in the valve casing 11 at certain times and for certain purposes, as will more fully hereinafter appear.

Located within the casing 11 is a differential valve 20 which, as herein shown, is of the lift or puppet type. This valve 20 is provided with an upper surface 21 and a depending stem portion 22. The lower surface or area 23 of the stem portion has a certain relative proportion to the surface or area 21 and both surfaces are affected by the pressures exerted upon each as will be presently described. A rubber valve 24 is positioned upon the stem portion 22 and beneath the surface 21, and fits the valve seat 25 which, as shown in the present instance, is of spherical formation. Any other type of valve of the same general construction may be employed in this connection and I do not limit myself to the exact construction shown.

The upper portion of the casing 11 in which the valve 20 operates is enlarged as at 26 and is provided with the groove 27 extending from the upper edge of the opening down to a point near the valve seat. This groove is of sufficient length so that when the valve 20 is lifted from its seat by virtue of the pressure, the air will escape out through the groove and on out into the pipe connection 10.

The casing 11 and pipe connection are joined by the swivel connection 28. A suitable gasket 30 is provided between the upper edge of the casing and the inner end of the pipe connection and prevents any leakage of the air.

At the lower end of the casing a fitting 31 is secured thereto and together with the pipe connection 9 provides the communication between the release valve and the reservoir.

In order that the several uses of my improved automatic release valve may be readily understood the positions of the valve as shown in Figs. 2, 3 and 4 will now be described.

In Fig. 2 the three-way valve has been turned and set so that the ports 14 and 15 are in alinement with the passageways 17 and 18 in the casing. This position is the normal position when the train is made up and ready for transit. Assuming that the brakes have been applied on the train and that the locomotive has been uncoupled and the train left standing with the brakes still applied, it now becomes necessary to release these brakes before the train can again be shifted and made up. In practice the usual custom is to open the angle cock, so as to bleed the train line; then open the release valve on each car until all of the brakes have been released, and the reservoir on each car emptied. By the present design of release valve it will be seen that as soon as the angle cock is opened at the end of the train, the train line pressure will flow out to the atmosphere. When the train line pressure has been sufficiently exhausted the valve 20 is caused to lift from its seat by the reservoir pressure acting upon the surface or area 23, thereby allowing the reservoir air to escape through the groove 27 on into the train line and out to the atmosphere through the angle cock. The areas of the surface upon the valve 20 are so proportioned as to keep the valve seated until a substantial reduction in the train line pressure has taken place, when the reservoir pressure which is much greater will operate upon the small surface or area 23 and lift the valve, allowing the air from the reservoir to pass through.

In practice the train line pressure is substantially reduced to atmospheric pressure before the reservoir pressure effects the opening of the valve 20. The respective areas of the surfaces upon the valve 20 regulate the correct operation of this differential valve, and I do not limit myself to the exact proportion shown and the pressure reduction set forth.

Thus it will be seen that after once setting the three-way valve, as shown in Fig. 2, in making up the train, no further manipulation of the release valve is necessary under normal running conditions; the brakes being released and the train line and reservoir emptied automatically as soon as the angle cock is opened.

In the position of the valve shown in Fig. 3 it will be noted that a manual operation of the valve has taken place because of a defective brake upon one of the cars. As hereinbefore mentioned, as soon as a brake becomes defective it is desirable to cut out the particular car so that the brakes do not respond. As shown in Fig. 3, the ports 14 and 15 are still in alinement, but the port 16 has been so moved as to register with the vent opening 19 in the casing. The cutout cock is the means now employed to prevent the train line pressure from entering the reservoir, but as most all of these valves leak it has been found impossible to prevent the train line pressure from backing up and entering the reservoir, and causing damage to the wheels. Therefore it will be seen that the three-way valve is so turned that should any air leak past the cut-out cock and then through the valve 20, it will pass out through the vent opening 19 to the atmosphere and not charge the reservoir and cause the damage to the wheels now experienced.

The position of the valve shown in Fig. 4 illustrates its operation to effect a retaining of the air in the reservoir should the cars break apart. Should an emergency case arise, or the trains break apart, the air in the reservoir is prevented from escaping by turning the valve 12 into this position. All communication with the atmosphere is immediately prevented and the reservoir pressure is retained until again needed.

From the foregoing it will be seen that an efficient release valve is provided in which numerous conditions arising in the working of an air brake system can be readily handled in a minimum amount of time and at a great saving of manual labor.

What I claim and desire to secure by Letters Patent is,—

1. In an air brake system the combination with a reservoir, train pipe and the brake controlling mechanism, of a release valve mechanism including an air connection between said reservoir and the train pipe, and a differential release valve located in said air connection for controlling the passage of the air from the reservoir to the atmosphere for releasing the brakes.

2. In an air brake system the combination with a reservoir, train pipe and the brake-controlling mechanism, of a release valve mechanism including an air connection between said reservoir and the train pipe, and a differential release valve located in said air connection, said valve being so proportioned as to remain closed until a reduction in the train line is made equal to atmospheric pressure.

3. In an air brake system, the combination with a reservoir, train pipe and the brake-controlling mechanism, of a release valve mechanism including an air connection between said reservoir and the train pipe, a differential release valve located in said air connection, and means independent of said differential valve for opening said reservoir to the atmosphere.

4. In an air brake system, the combination with a reservoir, train pipe and the brake-controlling mechanism, of a release valve mechanism including an air connection between said reservoir and the train pipe, a differential release valve located in said air connection, and means independent of said differential valve for opening said reservoir and the passageway leading from the differential valve to the atmosphere.

5. In an air brake system, the combination with a reservoir, train pipe and the brake-controlling mechanism, of a release valve mechanism including an air connection between said reservoir and the train pipe, a differential release valve located in said air connection, and means independent of said differential valve located between the reservoir and the said differential valve for opening said reservoir and the passageway leading from the differential valve to the atmosphere.

6. In an air brake system, the combination with a reservoir, train pipe and the brake-controlling mechanism, of a release valve mechanism including an air connection between said reservoir and the train pipe, a differential release valve located in said air connection, and means independent of said differential valve, located in said connection, for cutting off the communication between the reservoir and the atmosphere.

7. In an air brake system, the combination with a reservoir, a train pipe and the brake-controlling mechanism of a release valve, mechanism including a casing having passageways and an opening to the atmosphere, a differential valve located in said casing, a three-way valve located in said casing and adapted to register with said passageways and opening to the atmosphere.

8. In an air brake system, the combination with a reservoir, train pipe and the brake controlling mechanism, of a release valve mechanism including an air connection between said reservoir and the train pipe, and a release valve located in said air connection, for exhausting the air from the reservoir to the atmosphere when the angle cock of the system is opened to the atmosphere for releasing the brakes.

9. In an air brake system, the combination with a reservoir, train pipe and the brake controlling mechanism, of a release valve mechanism including an air connection between said reservoir and the train pipe, and a differential release valve located in said air connection, said valve being so proportioned as to remain closed until a substantial reduction in the train line is made sufficient to be overcome by the reservoir pressure.

In testimony whereof I affix my signature in presence of two witnesses.

NICHOLAS E. HIRSCH.

Witnesses:
JAMES W. ROBERTSON,
HAROLD R. FRECK.

Copies of this patent may be obtained for five cents each, by addressing the "Commissioner of Patents, Washington, D. C."